No. 834,778. PATENTED OCT. 30, 1906.
S. W. WARDWELL.
CLUTCH AND SPEED CONTROLLING DEVICE.
APPLICATION FILED JUNE 4, 1904.

2 SHEETS—SHEET 1.

WITNESSES

INVENTOR
Simon W. Wardwell
ATTORNEYS

UNITED STATES PATENT OFFICE.

SIMON W. WARDWELL, OF PROVIDENCE, RHODE ISLAND, ASSIGNOR TO UNIVERSAL WINDING COMPANY, OF PORTLAND, MAINE, A CORPORATION OF MAINE.

CLUTCH AND SPEED CONTROLLING DEVICE.

No. 834,778.   Specification of Letters Patent.   Patented Oct. 30, 1906.

Application filed June 4, 1904. Serial No. 211,205.

*To all whom it may concern:*

Be it known that I, SIMON W. WARDWELL, a citizen of the United States, residing at Providence, in the county of Providence and State of Rhode Island, have invented new and useful Improvements in Clutch and Speed Controlling Devices, of which the following is a specification.

My invention relates to clutch and speed controlling devices in which rotation is imparted to two or more shafts with adjustable relative speeds.

My invention is particularly adapted to winding-machines in which the rotation of the winding-spindle is controlled through a clutch mechanism and communicated to the cam-shaft, which reciprocates the thread-guide, at a speed capable of variation to suit the conditions of the winding.

The invention is fully described in the following specification and illustrated by the accompanying drawings, in which—

Figure 1:
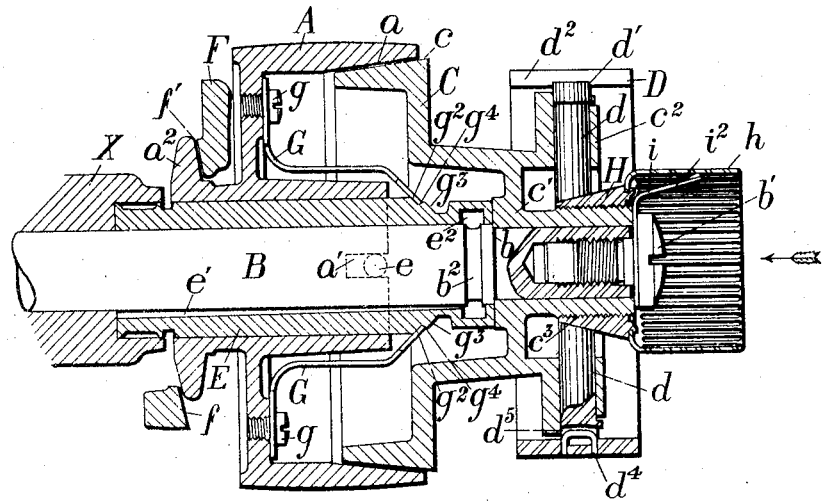
Figure 2:
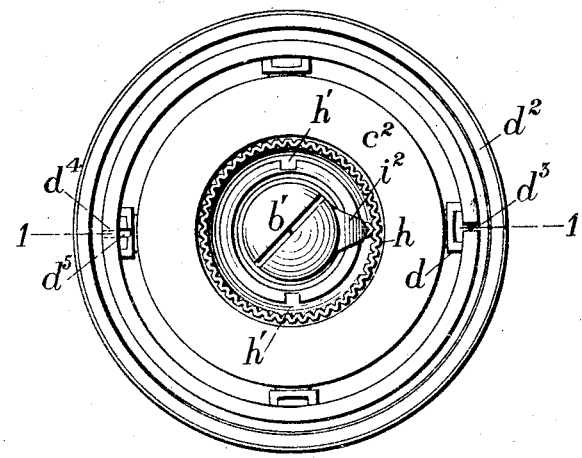
Figure 3:
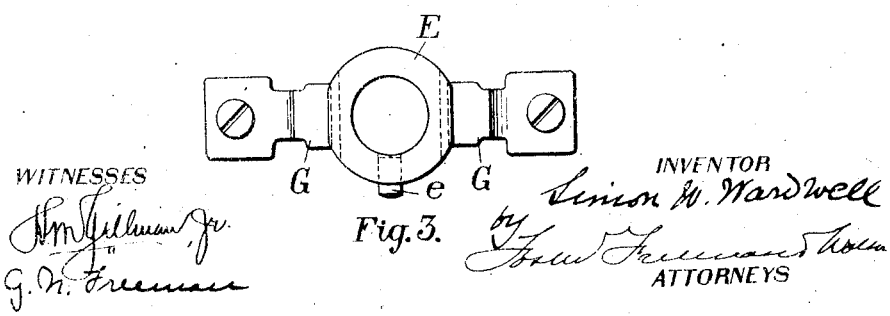
Figure 4:
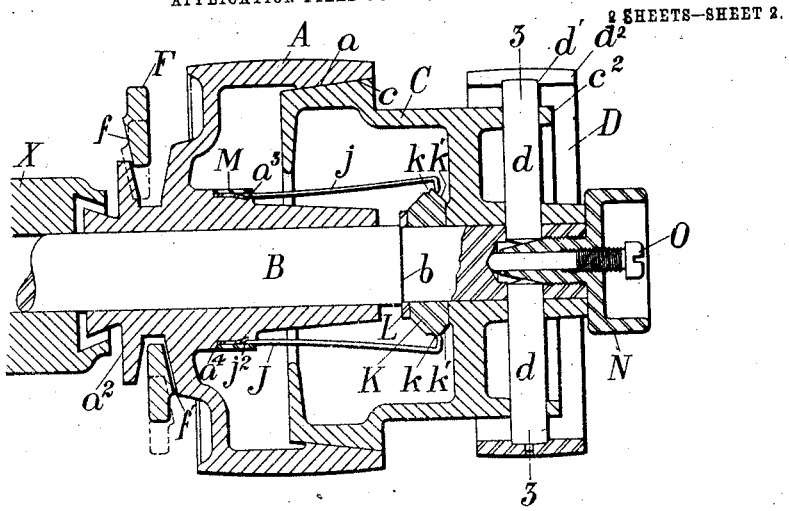
Figure 6:
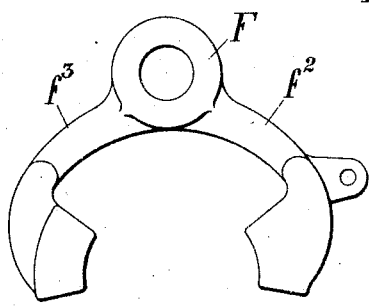
Figure 5:
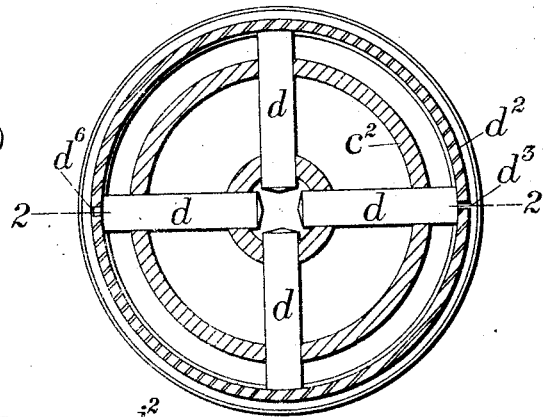
Figure 7:
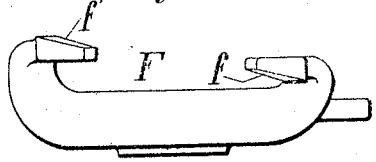
Figure 8:
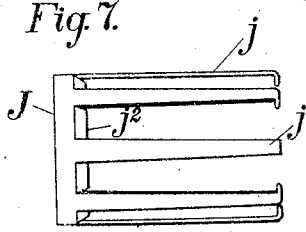
Figure 10:
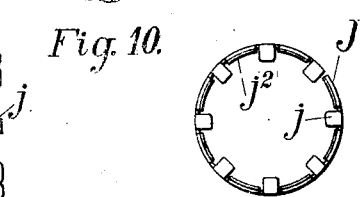
Figure 9:
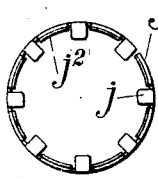

Figure 1 is a sectional plan view on line 1 1, Fig. 2, of the preferred embodiment of the invention, showing the relation of the driving member, clutch, and transmission member with the driving member disengaged from the clutch; Fig. 2, an end view of the same looking in the same direction of the arrow, Fig. 1; Fig. 3, a detail view of the same looking in the direction and showing the operating-springs; Fig. 4, another embodiment of the invention, being a sectional plan view on the line 2 2, Fig. 5; Fig. 5, a sectional view of this embodiment taken on line 3 3, Fig. 4; Fig. 6, an end view of the operating-lever used with this embodiment; Fig. 7, another view of the same; Fig. 8, a longitudinal view of the spring used with the latter embodiment; Fig. 9, an end view of the same; Fig. 10, an enlarged detail view showing the method of fastening the spring to the driving member in this arrangement.

My device comprises, essentially, a driving member or pulley A, free to rotate on a shaft, a clutch, of which the pulley constitutes one member, the other member, C, mounted upon the shaft to turn therewith, and a transmission member D, of which the member C of the clutch constitutes a part.

The shaft B may be the spindle of a winding-machine or any shaft to which it is desired to impart rotation and extends from its bearing X a sufficient length to support the members above mentioned. As shown in Fig. 1, the clutch member C is supported at the outer end of the shaft, which is reduced in diameter to form a shoulder $b$, against which the clutch is firmly clamped by means of a screw $b'$, engaging a threaded bore in the end of the shaft. The driving member A may be a pulley, as shown, or a friction-disk, or a gear, and is formed with a taper clutch-face $a$, adapted to engage the correspondingly-tapered face $c$ on the clutch. The pulley A is slidable in and out of engagement with the clutch, and in this instance I prefer to mount it on a bushing E, rotatable on the shaft, but held longitudinally between the bearing X and the hub $c'$ of the clutch. The bushing E is connected to rotate with the driving-pulley by means of a pin $e$, engaging a slot $a'$ in the hub of the pulley, the slot being of sufficient length to permit the pulley to slide longitudinally. A groove $e'$ is provided in the bore of the bushing and serves to entrain a portion of the oil supplied to the bearing X, so that its bearing on the shaft is sufficiently lubricated. To prevent the oil from working farther along the shaft, where it is not required, an annular channel is provided at the end of the bushing, formed by a groove $e^2$ in the bushing made to register with a corresponding groove $b^2$ in the shaft B. Any surplus oil reaching the end of the bushing while the shaft is rotating is thrown out by centrifugal force into the bushing-groove $e^2$, and when the shaft is still the oil settles in the shaft-groove $e'$ and lower part of the grooves $e^2 b^2$.

For throwing the driving-pulley in and out of engagement with the clutch I provide the novel means now described. On the inner end of the pulley-hub is a tapered flange $a^2$, adapted to be engaged on either side by the corresponding faces $f$ and $f'$ of an operating-lever F. The operating-levers for both embodiments of the invention are similar in general design, having two arms $f$ and $f^3$ extending from a hub and forked to straddle the hub of the driving-pulley. (See Fig. 6.) The difference between the lever used with the form of device shown in Fig. 1 and the lever illustrated in Fig. 6 is simply in the arrangement of the beveled extremities to adapt the former to engage the sides of the flange $a^2$ and the latter the sides of a groove, as hereinafter explained. In either case the lever is mounted on a rock-shaft, (not shown,) and the rocking of the shaft engages alternately the bevel-faces $f$ and $f''$ of the lever with the tapers on the driving-pulley. In winding-machines the rock-shaft is generally supported in the frame to be turned in one direction manually by means of a lever to start the machine and rocked in the opposite direction to stop it through a spring. (Not here shown.)

I have not here shown the rock-shaft and the rock-lever, because these are familiar from general use and have been before described in connection with clutch devices for winding-machines, as shown, however, in my application Serial No. 211,203, filed June 4, 1904. The essential element in the operation of this invention is the operating-lever F, which is supported and actuated through the well-known means mentioned.

It will be seen from Fig. 1 that when the face $f$ engages the flange $a^2$ the pulley A is forced along the shaft toward the clutch, and when the face $f''$ moves inward the pulley is carried in the opposite direction. The driving-pulley rotates constantly whether the shaft is rotating or not, and to prevent friction between the lever F and the flange $a^2$ I provide means for moving the pulley automatically the latter part of its throw in or out of engagement with the clutch. Through the agency of springs acting on oppositely-beveled faces the movement of the pulley is continued to carry the flange $a^2$ away from the faces $f$ and $f''$, so that the pulley rotates freely without friction from the lever F. This arrangement in the first embodiment described is as follows: Two springs G G, preferably of sheet metal, are fastened to the web of the pulley by the screws $g\ g$ and reach out beyond the hub of the pulley to bear on the bushing E. The bushing is flatted on opposite sides near its end and formed on both sides with two offset bevel-faces $g^2$ and $g^3$ with a step $g^4$, oppositely beveled, between them. The springs G G are bent downward at their outer ends, and with the pulley out of engagement with its clutch the bent portions bear on the faces or bevels $g^2 g^2$, with their ends resting against the steps $g^4 g^4$. (See Fig. 1.) When the pulley is forced toward the clutch by the face $f$ engaging the flange $a^2$, the ends of the springs are raised up over the point of the step $g^4$, and the springs then bear on the bevels $g^3 g^3$. The movement of the pulley effected by the lever F is just sufficient to change the springs from one bevel to the other, and the tendency of the springs being constrictive they then act on the bevels $g^4 g^3$ to slide the pulley out of engagement with the lever F and into engagement with the clutch, firmly holding it in this latter engagement to cause the rotation of the shaft. To release the pulley A from the clutch C, the face $f''$ is engaged with the flange $a^2$ by rocking the lever F in the opposite direction to that first described, and the pulley is thus moved sufficiently to raise the springs over the bevels $g^3 g^3$ onto the steps $g^4 g^4$. The pressure of the springs on the bevels of the steps acts in the manner before described to continue the movement of the pulley until the flange $a^2$ is removed from contact with the face $f''$ of the lever F.

The transmission member D may be of any form—as, for instance, a gear, friction-disk, or belt-pulley; but I prefer to use an expansible pulley capable of variation in diameter to regulate the speed of the driven shaft. I have shown a device similar in principle to that described in my Patent No. 690,494, granted January 7, 1902, in which a split rim is supported on plungers capable of radial adjustment to expand or contract the rim. By constructing the clutch member so that it constitutes an essential part of the pulley or transmission member the mechanism is simplified and compacted and its cost of manufacture cheapened.

On the clutch member C is formed an annular extension or ring portion $c^2$, bored to receive a plurality of radial spokes or plungers $d\ d$, &c., and constituting, in effect, the hub of the pulley. These plungers are adapted to slide in their bores and are formed with enlarged heads flattened to engage a groove $d'$ in the rim $d^2$ to retain the latter in position and also to prevent the plungers from turning in their bores. The rim of the pulley is a flat ring split at $d^3$ to allow expansion, and a staple $d^4$, driven into the ring, engages a slot $d^5$ in one of the plungers to prevent the ring from turning on the plungers. The inner ends of the plungers are beveled to fit a taper nut H, which engages the threaded portion $c^3$ of the clutch-hub. An extension $h$ on the nut provides a handhold whereby the nut may be turned to adjust the pulley, and, as shown in Figs. 1 and 2, I prefer to form this of sheet metal cup-shaped and corrugated to present a gripping-surface. The extension $h$ is fastened to the nut by its inner rim bent down to fit a shoulder on the nut, the flange formed by the shoulder being riveted over it, and two projections $h'\ h'$ on the extension entering slots in the flange to prevent the handle from turning on the nut. When the nut is screwed onto the clutch-hub, the plungers are forced outward to expand the pulley, and the reverse movement allows their inward movement due to the constrictive action of the spring-ring, so that the diameter of the pulley is reduced. To retain the nut in its adjusted position, I provide a check $i$, formed as a washer, tightly clamped against the clutch-hub by the screw $b'$ and having a spring-finger $i^2$ with a pointed end adapted to enter the flutes in the extension $h$. The finger $i^2$ yields sufficiently to allow the nut to be operated by the hand, but is rigid enough to prevent accidental turning when the nut is once adjusted.

In Fig. 4 is shown another form of the invention having slight changes in design, but substantially the same in principle. The pulley A is mounted directly on the shaft, and the lever F (shown in Figs. 6 and 7) operates on both sides of a tapered groove formed by the flange $a^2$ and the web of the pulley. The spring J is made of sheet metal formed in a ring with a plurality of prongs $j$, adapted to extend outward beyond the hub of the pulley. A collar K, formed with bevels $k$ and $k'$, serving the same purpose as the bevels on the bushing E in Fig. 1, is held between a washer L, abutting a shoulder on the shaft, and the hub of the clutch. The extremities of the prongs of the spring J are bent down, adapting them to bear on the bevels, and the collar K being free on the shaft rotates with the pulley A, owing to the friction of the spring when the shaft is stopped. It will be obvious that the collar K might be dispensed with by shortening the hub of the pulley A and forming annular bevels directly on the shaft B; but the arrangement described is preferable, since it saves the springs from the wear that would be consequent if the latter rotated on the bevels. The spring J is fastened to the pulley in the following novel manner: A groove is turned on the hub of the pulley to form a shoulder $a^3$. Between the prongs $j$ of the spring the edge of the ring portion is turned in, forming projections $j^2$, which when the ring is sprung onto the pulley-hub against the shoulder $a^4$ enter the groove and abut the shoulder $a^3$. (See Fig. 10.) A flat ring M is then forced on over the spring, holding it from displacement. The operation of this form of the device is the same as that of the embodiment previously described.

As shown in Figs. 4 and 5, the clutch in this form of structure is held on the shaft B by the plungers $d\ d$, &c., of the expansion-pulley, which extend through the rim and hub of the clutch and enter radial bores in the shaft. The shaft is bored longitudinally and threaded to receive the adjusting-nut N, which in this case is made with the handle and tapered portion in one piece. The ends of the plungers which engage the taper of the nut are formed conical, so that no provision to prevent their turning is necessary. A pin $d^6$ in one of the plungers engages a hole in the pulley-rim to cause the latter to rotate with the plungers, and the adjusting-nut N is secured from turning after adjustment by a check-screw O. The latter is threaded to engage a bore in the nut and has an extension reaching through to bear on the bottom of the bore in the shaft. When the check-screw is set against the bore, it binds the thread of the nut N and holds it from turning.

I am aware that clutch devices have before been made in which a sliding member engages a member fixed on the shaft, and I am also familiar with the type of expansible pulleys made with plunger-spokes. Therefore I do not claim the invention broadly, but wish to secure protection for my improvement in the structure and arrangement of the parts and the novel manner of their operation.

What I claim is—

1. The combination in a clutch device with a shaft, of a clutch member fast on the shaft, a driving member rotatable on the shaft and constituting the other clutch member, a lever to start the movement of the driving-clutch member, to or from the other clutch member and a resilient member to automatically continue said movement to force the driving-clutch member in or out of engagement with the other clutch member.

2. The combination in a clutch device, of a shaft, a member fast on the shaft, a second member rotatable thereon and adapted to be moved in or out of engagement with the first member, a lever to start said movement in each direction, and a resilient member to continue the movement of the second member automatically to carry it to or away from the first member.

3. The combination with a shaft, of a clutch member fast on the shaft, a driving-pulley rotatable and slidable on the shaft and constituting a sliding clutch member, a lever to start the sliding movement of the driving-pulley, and a spring acting automatically to continue said movement to carry the pulley into or out of engagement with the clutch member fixed to the shaft.

4. The combination in a clutch device, of a shaft, two clutch members supported thereby to permit one to move to and from the other, and a spring member extending from one clutch member, the other provided with a plurality of beveled faces arranged to be engaged by the end of the spring member in different positions of the latter, substantially as set forth.

5. The combination in a clutch device, of a shaft, two clutch members supported thereby to permit one to move to and from the other, a spring member extending from one clutch member, the other provided with a plurality of beveled faces arranged to be engaged by the end of the spring member in different positions of the latter, and means for shifting the sliding member of the clutch, substantially as set forth.

6. The combination with a shaft, of a clutch member fast on the shaft, a bushing rotatable on the shaft and formed with oppositely-beveled faces, a driving member rotatable with and slidable on the bushing and constituting a second clutch member, springs fastened to the driving member and adapted to bear on the said beveled faces, and means to slide the driving member to shift the springs from one face to the other for the purpose and in the manner described.

7. The combination with a shaft, of a clutch member fast on the shaft, a bushing rotatable on the shaft and flatted at one end with oppositely-beveled faces, a driving member rotatable with the bushing and slidable thereon and constituting a second clutch member and having reversely-beveled faces, springs fastened to the driving member and formed at their ends to correspond with the faces on the bushing, and a rock-lever adapted to engage alternately the opposite faces of the driving member, whereby the said member may be moved longitudinally to shift the springs from one bevel to the other.

8. In a clutch device, the combination with a shaft, of a beveled collar rotatable on the shaft, a second clutch member fast on the shaft, a driving clutch member rotatable on the shaft and slidable to engage the clutch member, and a ring-shaped spring member fastened to the driving member and having a plurality of prongs with hooked extremities adapted to bear on the bevels of the collar, substantially as set forth.

9. The combination in a clutch device with a fixed clutch member, of a sliding clutch member having a hub formed with a groove, a spring formed with a split ring having prongs extending therefrom and projections alternating with the prongs, said projections bent to engage the groove, and a ring inclosing the spring and retaining it in the groove.

In testimony whereof I have signed my name to this specification in the presence of two subscribing witnesses.

SIMON W. WARDWELL.

Witnesses:
   CHAS. A. EDDY,
   THOMAS M. CHILDS.